United States Patent [19]
Cona

[11] Patent Number: 5,570,825
[45] Date of Patent: Nov. 5, 1996

[54] REAR MOUNT BICYCLE CARRIER RACK FOR MOTOR VEHICLES

[76] Inventor: John A. Cona, 1111 Pebble Brook Rd., Cedar Park, Tex. 78613

[21] Appl. No.: 446,421

[22] Filed: May 22, 1995

[51] Int. Cl.⁶ ................................................. B60R 9/042
[52] U.S. Cl. ......................... 224/495; 224/511; 224/523; 224/534; 224/537; 224/546; 224/551; 224/568; 224/571; 224/924
[58] Field of Search ........................ 224/402, 405, 224/403, 310, 281, 489, 491, 498, 501, 523, 924, 495, 511, 534, 537, 546, 551, 568, 571; 280/769, 186; 212/230, 269; 211/151, 162, 172; 248/214

[56] References Cited

U.S. PATENT DOCUMENTS

| | | | |
|---|---|---|---|
| 4,702,401 | 10/1987 | Graber et al. | 224/924 |
| 5,094,373 | 3/1992 | Lovci | 224/924 |
| 5,360,150 | 11/1994 | Praz | 224/310 |
| 5,497,927 | 3/1996 | Peterson | 224/924 |

*Primary Examiner*—Henry J. Recla
*Assistant Examiner*—Kam Shah
*Attorney, Agent, or Firm*—Joseph F. Long

[57] ABSTRACT

A rack particularly suited for carrying one or more bicycles held firmly in place with a three point connection without the necessity for removing a wheel and with the rack extensible to allow moving the loaded rack with minimal effort to gain access to the rear of the vehicle being used.

5 Claims, 3 Drawing Sheets

5,570,825

REAR MOUNT BICYCLE CARRIER RACK FOR MOTOR VEHICLES

BACKGROUND OF THE INVENTION

There are several patents in this field; this may indicate a continuing need for improved racks for carrying objects such as skis, bicycles, suitcases etc behind an automobile.

The objectives of this invention include having a rack that:

a) attaches to a standard hitch on a vehicle, b) allows loading and unloading with minimal lifting, c) allows moving the loaded rack with minimal effort to provide access to the rear door of the vehicle, e) is rugged enough for usage with two bicycles, ski equipment, suitcases, etc., f) has a three point attachment to hold bicycles firmly in place with or without removing a wheel, g) has a quick release mechanism to allow movement of the rack from load to travel position, and h) has a pivoting support arm to allow transport of different sizes of bicycles.

All these objectives are accomplished with the present invention.

The closest prior art found is U.S. Pat. No. 5,377,886 issued Jan. 3, 1995 to J. R. Sickler. The invention differs significantly from Sickler in that a) a quick release mechanism to allow moving the rack to variable positions while loaded rather than being limited to fixed positions wherein the rack may be pinned into place, b) rollers internally in our telescoping rack to allow easier movement of the rack, c) in one embodiment, a fold down wheel at an end position on our rack to allow free movement with release of the quick release pin to give access to the rear door of the vehicle, d) a three point connection for a bicycle to hold the bicycle firmly in place without removing a wheel.

SUMMARY OF THE INVENTION

The invention comprises:

a) a two part or two segment extensible, or telescoping, support shaft with a bolted or pin type connection to a trailer hitch, b) a lever type eccentric clamp to allow clamping the segments in a desired position, c) one or more U shaped support channels fastened at right angles to the rearward segment of the support shaft, d) tie down straps to fasten each wheel of a bicycle in the support channels, e) a dual legged frame support clamp between the tie down straps and movable to fasten to the frame of different sized bicycles, f) in one embodiment, a fold down wheel to support the weight of the loaded rack as the load is moved rearward to allow access to the rear of the vehicle.

DETAILED DESCRIPTION OF THE DRAWINGS

Figure 1:
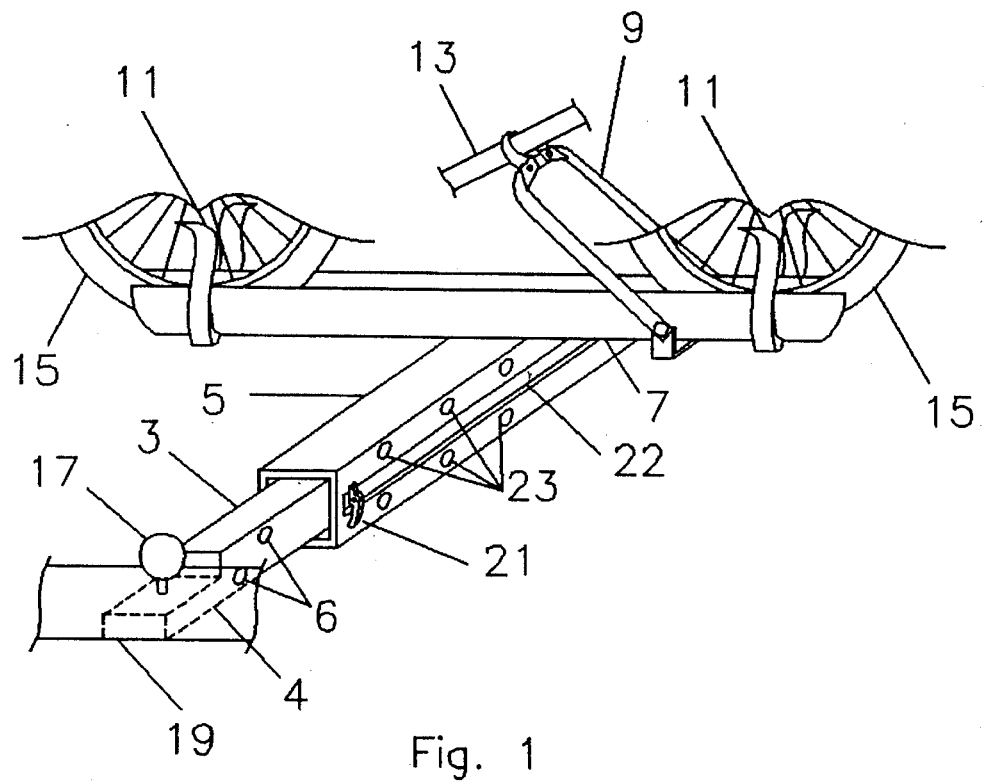
FIG. 1 shows a three dimensional view of invention.
Figure 5:
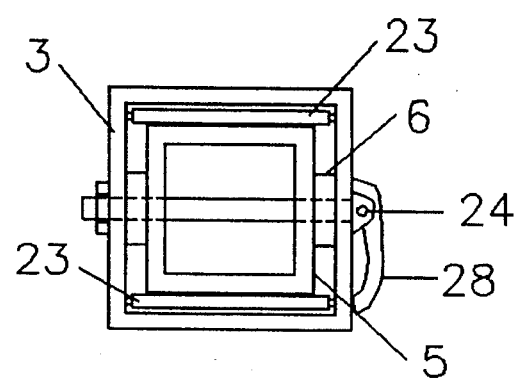
FIG. 5 shows operation of the quick action eccentric clamp for clamping the first and second section of the support shaft in one position.

The invention may best be described from the drawings. The major elements of the invention are shown in FIG. 1. The beginning flat or square end of the inner or first section 3 of the extensible shaft is welded to connector piece 4 and pinned or bolted to bumper 19 with pin or bolt 17 to have minimal sidewise motion of the first section 3 of the extensible shaft. The second section 5 of the extensible shaft has internal rollers 23 and the first section 3 has spacers 6 so that the sections may be extended to allow opening a rear door of the transport vehicle when the rack is loaded. The lever type eccentric clamp 21, shown in more detail in FIG. 5, is bolted through section 3 and slides in slots 22 in both sides of section 5. This lever type eccentric clamp allows easy and rapid release or clamping to fasten the two sections 3 and 5 together. The channel 7, preferably with a U shaped cross section, is fastened at right angles to the section 5 about six inches from the end of the section so that when the extensible sections are pushed together that the load is very close to the rear of the support vehicle. Tie down straps 11, shown in more detail in FIG. 2, may be used to anchor both wheels of bicycle 15 in the U shaped support channel 7. With wheels fastened in place dual legged frame support clamp 9, shown in more detail in FIG. 3, is pivoted to clamp to the bicycle frame 13. The pivot action allows this clamp to fasten to the frame of bicycles of differing heights.

Figure 2:
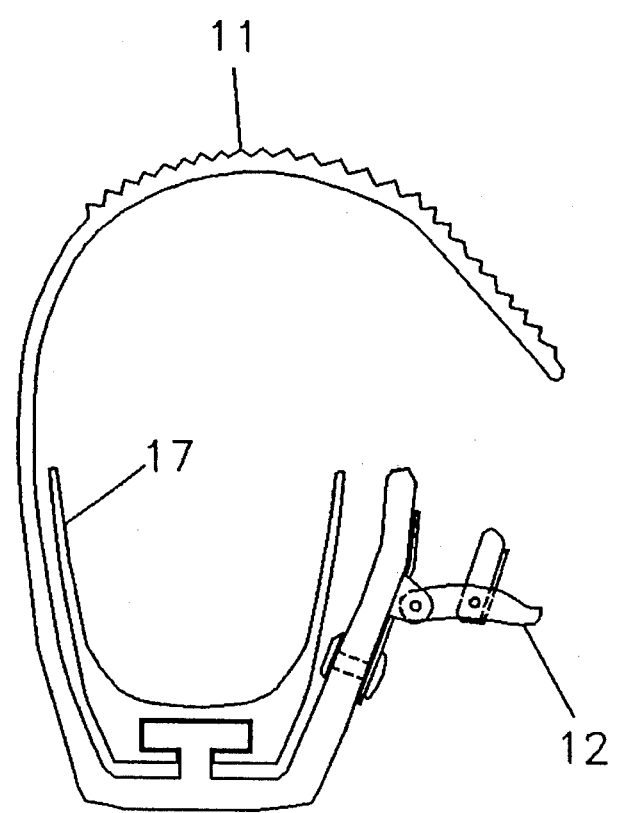
FIG. 2 shows a cross section of the U shaped support channel and a side view of the tie down straps.
Figure 3:
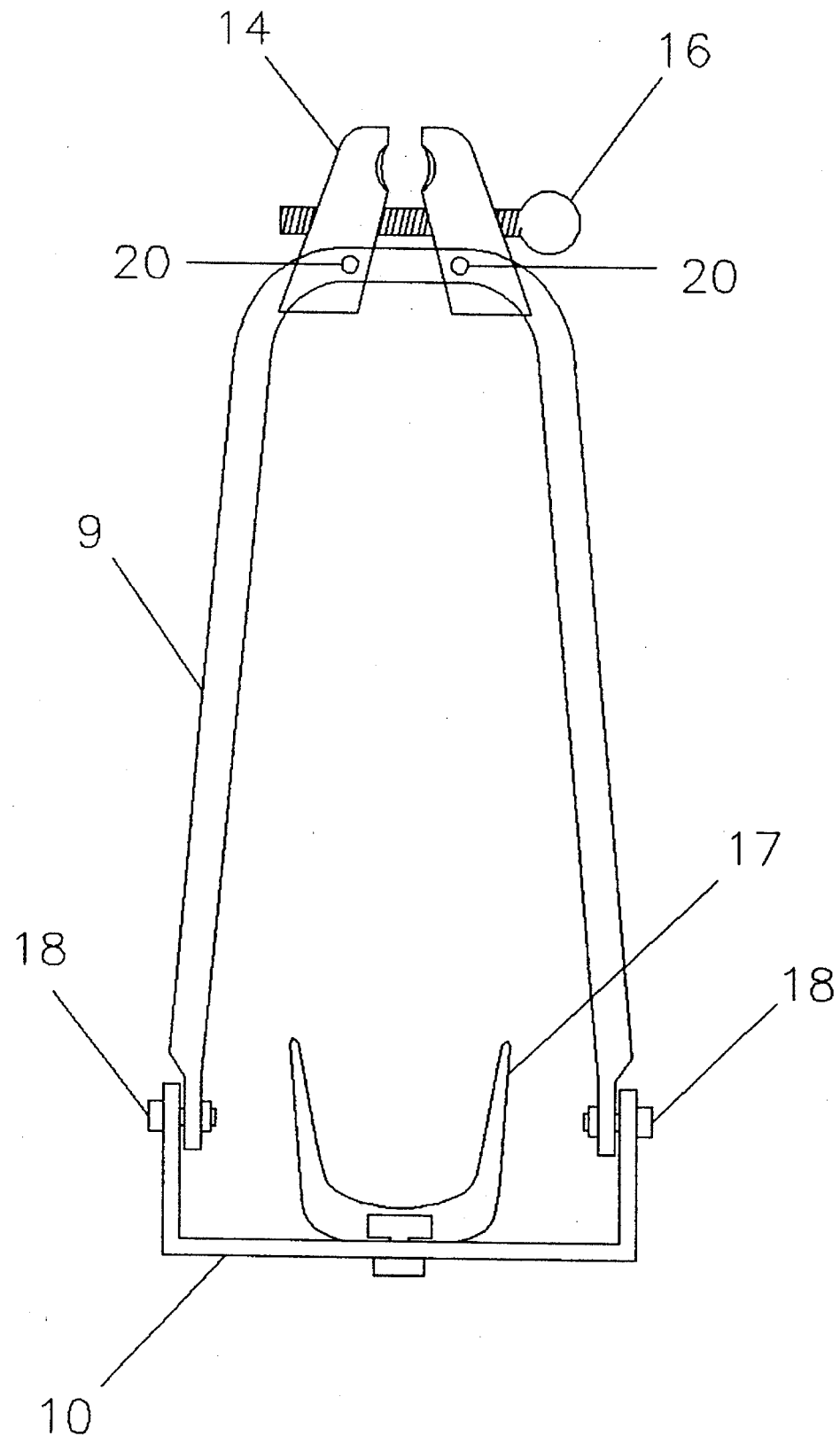
FIG. 3 shows the pivotally attached dual legged frame support clamp.

In FIG. 2 a cross section is shown of the tie down strap 11 that slides into the U shaped support channel 7. The end of tiedown strap 11, conveniently made from plastic, may be pulled through locking mechanism 12 to tie a bicycle wheel firmly in place. Locking mechanism 12 allows for easy release but other tiedown straps such as a VELCRO straps would also be suitable.

In FIG. 3 the bottom segment 10 of the U shaped support clamp 9 with pivot points 18 is about eight inches wide and may be fastened to the U shaped support channel 7 with a bolt. Clamp jaws 14 are pivotally attached with pins 20 and are preferably rubber lined to prevent scarring of the bicycle frame as they are tightened on the bicycle frame using the threaded bolt and wing nut 16. The frame of clamp 9 may be made of one half inch steel tubing.

Figure 4:
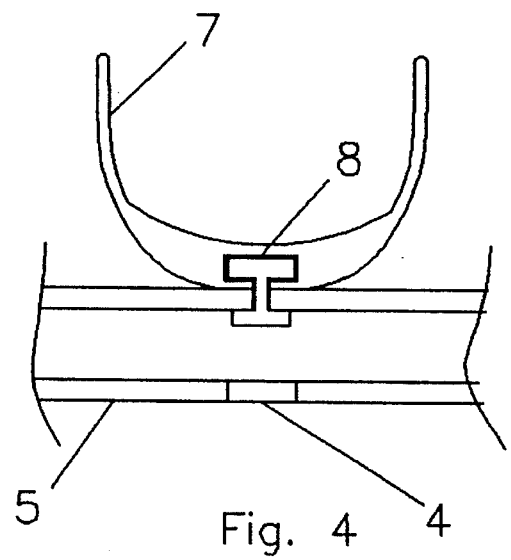
FIG. 4 shows details of the connection of the U shaped support channel connection to the outer section of the extensible support shaft.

In FIG. 4 the U shaped support channel 7 is shown fastened at right angles to the outer or second section of the extensible support shaft 5. There is about a one inch opening 4 to allow socket wrench access to tighten bolt 8.

In FIG. 5 a cross section is shown of the first segment 3 that slides into the second section 5 to move on rollers 23 with spacers 6 keeping the segments aligned. The lever type eccentric clamp is bolted through segment 3 and slides through slots 22 in the outer or second section 5 as shown in FIG. 1. The shape of the head end of the lever 28 causes clamp 21 to loosen when the lever is in the raised position and to tighten and hold when the lever is pushed downward.

Figure 6:
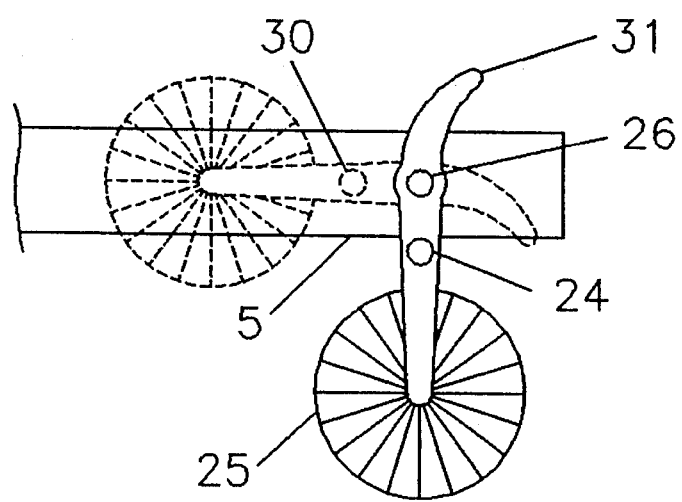
FIG. 6 shows the fold down weight carrying wheel.

In FIG. 6 weight support wheel 25 is shown pivotally attached at point 26 in segment 5 and pulled down with handle 31 and locked in place with lock pin 24. The wheel supports the weight of the load to allow easy movement of segment 5 over segment 3. The wheel 25 may be locked into place through holder 30 for travel position as shown in dotted lines.

What is claimed is:

1. A rear hitch mounted bicycle rack comprising;
   a) an extensible support shaft having opposite end portions with a minimum of two sections;
   b) a connector means on one portion of a first section of said minimum of two sections, said connector means being fastenable to a trailer hitch on a vehicle to rigidly connect said first section to said vehicle;
   c) a roller means in a second section of said minimum of two sections, said roller means allowing said second section to slide smoothly over said first section;
   d) longitudinal slots through opposite sides of said second section,
   e) a lever type eccentric clamp means fastened to said first section and extending through said slots and manually operable to fasten said second section rigidly to said first section;
   f) at least one support channel fastened at an approximate midpoint thereof to said second section between opposite ends thereof;
   g) a tie strap means on each end of said at least one support channel, said tie strap means being activatable to fasten each wheel of a bicycle firmly in said channel;
   h) a dual legged frame support clamp means pivotally attached to at least one support said channel and operable to rigidly clamp said bicycle frame in place.

2. A rear hitch mounted bicycle rack as in claim 1 further comprising a fold down wheel means pivotally attached to the opposite end portion of said second section and manually positionable to engaging the ground adjescent said vehicle to carry the weight of said rack to allow positioning said second section over said first section with minimal effort.

3. A hitch mounted bicycle rack comprising:
   a) an extensible shaft means having opposite end portions with a minimum of two sections;
   b) a fastener means to rigidly fasten one end portion of a first section of said extensible shaft means to a hitch on a vehicle;
   c) a roller means to allow a second section of said extensible shaft to slide smoothly over said first section;
   d) a slot in each side of said second section;
   e) a lever type eccentric clamp means mounted in said first section and extending through said slots in said second section and manually operable to fasten said second section rigidly to said first section;
   f) at least one support channel with a U shaped cross section fastened to said second section at right angles to said second section;
   g) tie down strap means to fasten each wheel of a bicycle in said support channel;
   h) a dual legged frame support clamp means with one leg pivotally attached on each side of said support channel, said frame support clamp means acting to clamp to a frame to said bicycle to said support channel;
   i) a fold down wheel means pivotally attached to the opposite end portion of said extensible support shaft and movable to a folded down position to engage the ground adjescent said vehicle to allow easy movement of said second section with respect to said first section of said support shaft to allow access to said vehicle when said support channels are carrying a load.

4. A hitch mounted bicycle rack comprising:
   a) an extensible shaft means having opposite end portions with a minimum of two sections;
   b) a fastener means to rigidly fasten one end portion of a first section of said extensible shaft means to a hitch on a vehicle;
   c) a roller means to allow a second section of said extensible shaft to slide smoothly over said first section;
   d) a slot in each side of said second section;
   e) a clamp means mounted in said first section and extending through said slots in said second section and manually operable to fasten said second section rigidly to said first section;
   f) at least one support channel fastened to said second section at right angle to said second section;
   g) tie strap means to fasten each wheel of a bicycle in said support channel;
   h) a dual legged frame support clamp means with one leg pivotally attached on each side of said support channel, said frame support clamp means adapted to clamp to a frame of said bicycle.

5. A hitch mounted bicycle rack as in claim 4 wherein said clamp means is a lever type eccentric clamp that tightens with said lever pushed downward and loosens with said lever pulled upward.

* * * * *